July 4, 1939.  J. C. DRADER  2,164,642
METHOD AND MEANS FOR CONSTRUCTING GEAR FINISHING TOOLS
Filed July 12, 1935  2 Sheets-Sheet 1
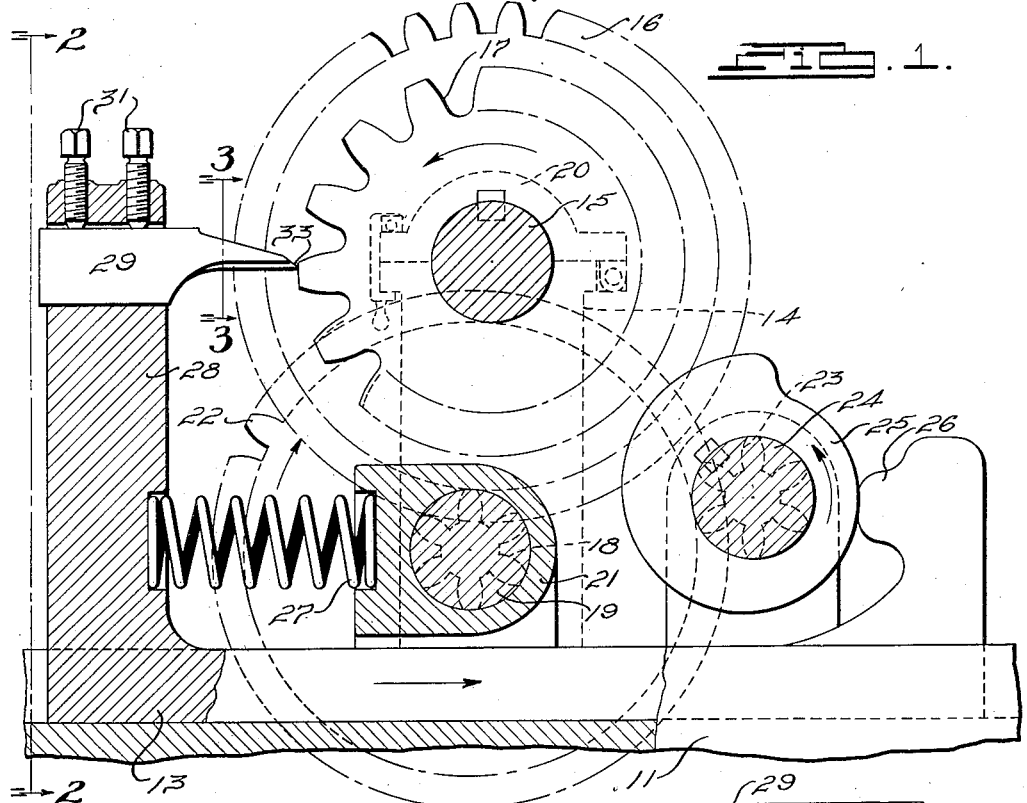
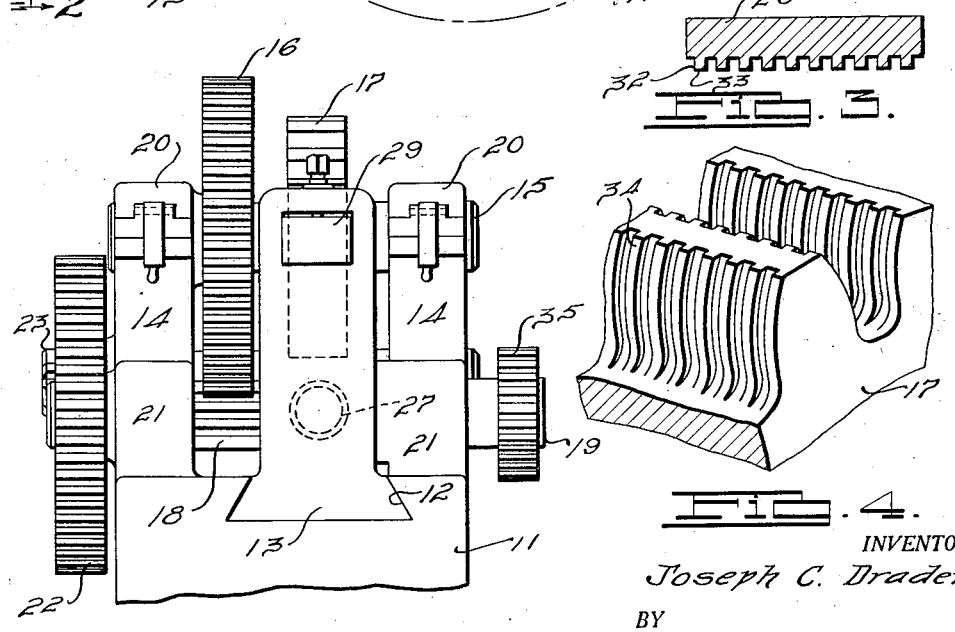
INVENTOR.
Joseph C. Drader.
BY
Harness, Dickey, Pierce & Hann.
ATTORNEYS.

July 4, 1939.   J. C. DRADER   2,164,642
METHOD AND MEANS FOR CONSTRUCTING GEAR FINISHING TOOLS
Filed July 12, 1935   2 Sheets-Sheet 2
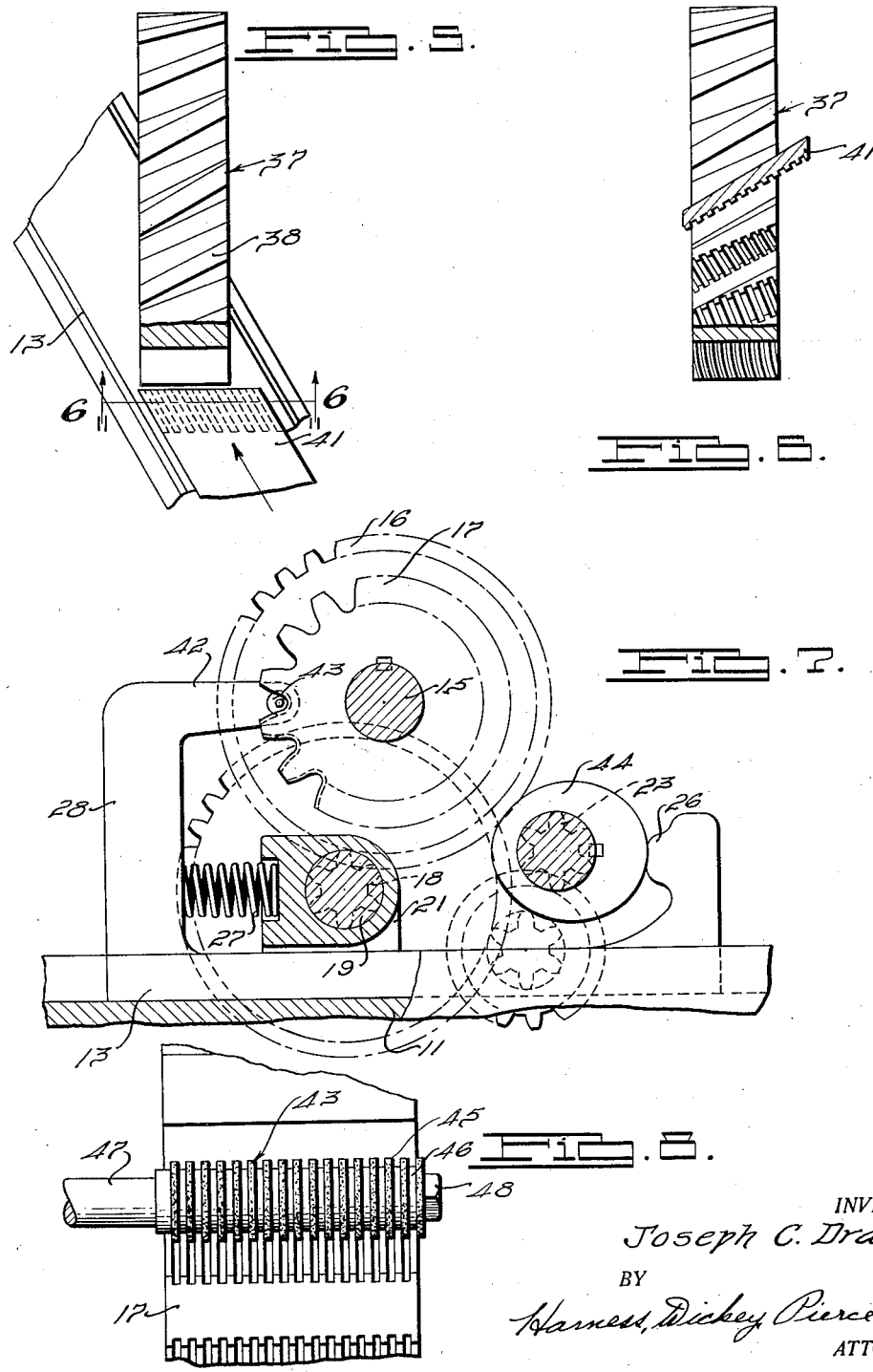
INVENTOR.
Joseph C. Drader.
BY
Harness, Dickey, Pierce & Hann.
ATTORNEYS.

Patented July 4, 1939

2,164,642

UNITED STATES PATENT OFFICE 2,164,642

METHOD AND MEANS FOR CONSTRUCTING GEAR FINISHING TOOLS

Joseph C. Drader, Detroit, Mich., assignor to Michigan Tool Company, a corporation of Delaware Application July 12, 1935, Serial No. 30,966

13 Claims. (Cl. 51—52)

My invention relates to tools and particularly to a method and means of constructing tools of the gear finishing type.

In the copending application of William F. Dalzen, Serial No. 588,635, filed January 25, 1932, and assigned to the assignee of the present application, an improved tool is disclosed and claimed for finishing gears in accordance with the method set forth and claimed in the copending application of William F. Dalzen, Serial No. 554,193, filed July 31, 1931, and also assigned to the above mentioned assignee. The method comprises the finishing of gear teeth by a tool having teeth the working flanks of which are provided with a plurality of cutting edges. The cutting edges are formed by a plurality of closely disposed lands separated by grooves, the edges of which are available for cutting in opposite directions. The lands and grooves are of approximately the same width, substantially one-sixteenth of an inch or less, although the dimensions may vary, depending upon the size of the gear teeth to be machined. The slots are disposed across the working faces radially of the tool, and the lands have cutting edges on their side edges, so that no cutting action takes place on the roll of the tool and gear. In operation, a lateral component of movement is introduced between the faces of the gear teeth and the tool teeth, which effects the machining action. In this manner uniform machining occurs at the crown, through the pitch line and root of the teeth and accurate involute forms are produced. The side cutting motion may be provided by mechanical means or may be introduced by offsetting the axes of the tool and gear to provide a lateral component of movement between the tooth faces thereof.

In accordance with the present invention, I provide a method and means of producing a plurality of closely disposed lands on the teeth of a tool which may be circular or of the rack type. While I have illustrated the method and means as applied to a circular tool, it will be apparent from further description that the same method and means may be applied to a rack tool. A tool cutter is employed having a plurality of closely disposed lands, the ends of which are provided with cutting edges, and which is advanced toward the axis of the tool to be machined during the time the tool is rotated. The movements are synchronized by a cam, or other means, which advances the cutting edges in accordance with the involute form of the teeth until the edges pass the roots of the teeth. As the rotation of the tool continues, the cutting edges are withdrawn beyond the crown of the tool teeth, permitting the tool to be indexed to present another tooth to the cutter, after which the inward cutting action is repeated. When a spur type of tool is being machined, the cutter is disposed parallel to the plane of the tool and is moved normal to the axis during the slotting of the teeth. When a spiral type of tool is employed, the cutter is disposed on the helix angle of the teeth and is advanced normal to such angle.

In accordance with the present invention, I also provide a grinding element built up from a plurality of thin, washerlike abrading elements which may be advanced across the face of the teeth of the tool to grind the slots therein in the manner described above. The teeth are preferably so formed as to have the root extended below the normal root line to provide clearance for the termination of the machining operation and to permit the teeth to be resharpened and still have the form retained thereon.

Accordingly, the main objects of my invention are: To provide a method and means for accurately and rapidly machining closely disposed lands and grooves in the working flanks of teeth of a gearlike tool; to provide a cutter having a plurality of lands which are sharpened on the end to cut a plurality of slots in the working faces of teeth; to provide means for advancing the cutting edges of the cutter across the involute form of teeth to have the edges follow the involute form until they pass the root portion thereof; to provide a support for the cutter which is moved during the operation of the tool being machined to advance the cutter in accordance with the involute form on the tool teeth; to dispose the cutter in the plane of the working face of the teeth and advance its cutting edges in a plane normal thereto; to machine a plurality of grooves in the tool teeth which extend below the root thereof to form a plurality of lands having right angle cutting edges which are parallel to the plane of rotation of a gear to be machined by the tool; to advance a grinding wheel made up of a plurality of spaced washerlike abrading elements across the teeth of the tool to grind spaced slots therein; and, in general, to provide a method and means for accurately slotting the working faces of the teeth of a gearlike tool, which is simple, positive and economical.

Other objects and features of novelty of my invention will be either specifically pointed out or will be apparent, when referring, for a better understanding of my invention, to the following description taken in conjunction with the accompanying drawings, wherein:

Figure 1 is a view, partly in section and partly in elevation, of a device for slotting the teeth of a tool in accordance with my invention;

Fig. 2 is a reduced end view of the structure illustrated in Fig. 1;

Fig. 3 is a sectional view of the structure illustrated in Fig. 1, taken on the line 3—3 thereof;

Fig. 4 is a broken, enlarged view of portions of teeth of the tool illustrated in Fig. 1 after the machining operation;

Fig. 5 is a view, partly in section and partly in elevation, of a spiral type of gear being machined by the device illustrated in Fig. 1;

Fig. 6 is a broken, sectional view of the structure illustrated in Fig. 5, taken on the line 6—6 thereof;

Fig. 7 is a view of a structure similar to that illustrated in Fig. 1, showing a modified form thereof, and Fig. 8 is an enlarged broken view of the grinding tool employed with the structure illustrated in Fig. 7.

The device illustrated in Figs. 1 and 2 comprises a bed 11 having a dovetail slot 12 therein in which a carriage is disposed for reciprocating movement. The bed 11 is provided with bosses 14 in which a shaft 15 is supported to be driven by a gear 16. The bosses 14 are provided with bearing caps 20 which are removable to permit insertion and removal of the work element 17, which represents the tool to be machined. The work element 17 is illustrated as a gearlike blank, the teeth of which are to be slotted and thereafter hardened. The gear 16 meshes with a gear 18 which is mounted on a shaft 19, journaled in bosses 21. A gear 22 is also mounted on the shaft 19 and engages and drives a gear 23 and shaft 24 upon which a cam 25 is mounted to rotate therewith.

The carriage 13 is provided with a cam engaging nose 26 by which the carriage is moved to the right, as viewed in Fig. 1, against the bias of a spring 27 which retains the nose 26 against the surface of the cam 25. Carriage 13 is provided with a tool support 28 in which a tool 29 is secured by set screws 31. The cam 25 is shaped to advance the tool 29 at such a rate with respect to the slowly rotated work element 17, that a groove of involute or other desired tooth form is cut on the working face of element 17 which extends from the crown thereof slightly past the root line thereof. The tool 29 is illustrated in section in Fig. 3 as being provided with a plurality of lands 32, the forward ends 33 of which are sloped to provide sharp cutting edges. Each of the lands 32 will cut a groove in the working face of the teeth of element 17 to produce a plurality of similar lands 34 on the teeth of the tool, as illustrated in Fig. 4.

The tool 17 worked upon is herein illustrated as being of the spur type and the carriage 13 is drawn directly toward the axis in a plane normal thereto to have the cutting edges disposed normal to the tool axis. A suitable pulley or gear 35 may be attached to shaft 19 to effect the driving of the device.

With reference to the operation of the device as a whole, it will be understood that rotation of driving pulley 35 effects counterclockwise rotation of the work element 17 through gears 16 and 18. A corresponding counterclockwise rotation of cam 25 is effected through gears 22 and 23. The parts are illustrated in the relative positions occupied at the beginning of a cutting movement, and further counterclockwise rotation of work element 17 from the illustrated position is accompanied by a gradual movement of tool 29 to the right, as viewed in Fig. 1. The movement of tool 29 is caused by the gradually increasing radius of cam 25, which forces nose 26 and hence carriage 13 and tool 29 to the right against the force of biasing spring 27. As previously mentioned, the configuration of cam 25 is such that the rightward movement thereof, in conjunction with the rotation of work element 17, effects the cutting of a groove having an involute or other desired form on the face of a tooth of the element 17. Shortly after the working end 33 of tool 29 passes the root line of work element 17, the dwell of cam 25 engages nose 26. Further rotation of cam 25 brings a portion of minimum radius thereof opposite nose 26, and permits the latter to move substantially to the left as viewed in Fig. 1, under the influence of spring 27, moving tool 29 to the left out of range of the teeth of work element 17. The shape of the cam 25 is such that tool 29 remains out of range of the teeth of work element 17 until element 17 is rotated to bring a second tooth to the working position. Thereafter, continued rotation of the parts effect the cutting of a groove in such second tooth in the manner just described. After the working faces of one side of the teeth have all been machined in this manner, the tool 17 is then removed and replaced after being turned axially through 180 degrees so as to have the remaining opposite faces available to be machined in the same manner.

In Figs. 5 and 6 I have illustrated tools 37 of the spiral type, having teeth 38 disposed on a predetermined helix angle. The carriage 13 for supporting the tool is mounted to be advanced in a plane normal to the helix angle of the teeth to have the cutting edges disposed normal thereto. The cutting edges are disposed in this manner when the tool is to mate and operate on a gear of the spur type to have the cutting edges normal to the tooth faces to produce right angled cutting edges. The operation of the device is similar to that illustrated in Figs. 1, 2 and 3 and as above described. It will be noted from Fig. 6 that the tool 41 employed on the spiral gears has a plurality of lands disposed in the plane at an angle to the axis of the tool rather than parallel thereto, as illustrated in Fig. 1. The shank of the tool may be retained rectangular, as illustrated in Fig. 2, and the cutting portion of the tool disposed at an angle thereto, which will follow the angle of the teeth of the spiral tooth being machined.

In Fig. 7 I have illustrated a similar mechanism as that above described, with the exception that the tool support 28 has an extending arm 42 thereon which supports a grinding wheel 43. The control cam 44 distinguishes from the above described cam 25 in that it is shaped to effect a grinding action during both the inward and outward movements, so that, in operation, carriage 13 causes the wheel 43 to advance inwardly along one side of one tooth, and machining it to the desired form, and thereafter to advance outwardly along an adjacent side of an adjacent tooth, correspondingly machining it. Two tooth faces are therefore acted upon during each operating cycle.

The tool 43 is illustrated in Fig. 8 as comprising a plurality of washerlike abrading elements 45 spaced apart by washers 46 and mounted on a shaft 47 which is driven in rotation at high speed.

The abrading discs 45 and spacing washers 46 are retained in unit relation by a suitable bolt 48. When the grinding tool 43 is employed, the work element may be first hardened and accurately ground to form and thereafter slotted through the operation of the tool 43 and the advancement and retraction of the carriage 13. The grinding operation is illustrated as occurring on a spur type of tool, but it is to be understood that it applies just as readily to the spiral type of tool illustrated in Figs. 5 and 6.

While I have described and illustrated several embodiments of my invention, it will be apparent to those skilled in the art that various changes, omissions, additions and substitutions may be made therein without departing from the spirit and scope of my invention, as set forth in the accompanying claims.

What is claimed is:

1. The method of machining a plurality of adjacently disposed slots in the working faces of the teeth of a gear-like cutting tool which includes the steps of rotating said tool, advancing a cutter having a plurality of spaced slotting lands across a said tooth at such a speed relative to the rotation of the tool as to have the lands follow the involute form thereof, and retarding such advancement near the root of the tooth to cause the tool to relatively move out of cutting engagement with the tooth as the tool continues to rotate.

2. The method of machining a plurality of adjacently disposed slots in the working faces of the teeth of a gear-like cutting tool which includes the steps of rotating said tool, advancing a cutter having a plurality of spaced slotting lands across a said tooth at such a speed relative to the rotation of the tool as to have the lands follow the involute form thereof, and retarding such advancement near the root of the tooth to cause the tool to relatively move out of cutting engagement with the tooth as the tool continues to rotate, the advancement of said tool occurring in a plane normal to the plane of the working face being machined.

3. The method of machining a plurality of adjacently disposed slots in the working faces of the teeth of a gear-like cutting tool which includes the steps of rotating said tool, advancing a cutter having a plurality of spaced slotting lands across the tool teeth at such a speed relative to the rotation of the tool as to have the lands follow the involute form thereof retarding such advancement near the root of the tooth to cause the cutter to relatively move from the tooth as the tool continues to rotate, and thereafter rapidly returning the cutter to its initial position to permit an adjacent tooth to move to a position to be machined.

4. The method of machining a plurality of adjacently disposed slots in the working faces of the teeth of a gear-like cutting tool which includes the steps of rotating said tool, advancing a cutter having a plurality of spaced slotting lands across a said tooth at such a speed relative to the rotation of the tool as to have the lands follow the involute form thereof, retarding such advancement near the root of the tooth to cause the cutter to relatively move from the tooth as the tool continues to rotate, thereafter rapidly returning the cutter to its initial position to permit an adjacent tooth to move to a position to be machined, and of changing the position of the gear-like tool being machined end for end to bring the opposite faces thereof into a machining position.

5. The method of machining a plurality of adjacently disposed slots in the working face of a spiral, gear-like cutting tool, which includes operating the tool in rotation, advancing a cutter having a plurality of spaced slotting lands in the plane of the spiral angle of the teeth at a variable speed relative to the rotation of the gear-like cutting tool to follow the form of the tooth thereof, and retarding said cutter advancement when the cutter reaches a point near the root of the advancing tooth to cause the tool to move out of cutting relation to the tooth.

6. The method of machining a plurality of adjacently disposed slots in the working faces of the teeth of a gear-like cutting tool, having a selected form, which includes the steps of rotating said tool, advancing a cutter having a plurality of spaced slotting lands inwardly across one face of one tooth and withdrawing said tool outwardly across an opposite face of an adjacent tooth, the inward and outward movement of said tool occurring at such a speed relative to the rotation of the tool as to have the slots correspond to said selected form.

7. The method of machining a plurality of adjacently disposed slots in the working faces of the teeth of a gear-like cutting tool, having a selected form, which includes the steps of operating the tool in rotation, advancing a cutter having a plurality of spaced slotting lands inwardly across the trailing face of one tooth and withdrawing said cutter outwardly across the leading face of an adjacent tooth, the inward and outward movement of said cutter occurring at such a speed relative to the rotation of the tool that the slots correspond to said selected form.

8. A device for machining the working faces of the teeth of a gear-like cutting tool which comprises, in combination, a cutter disposed for inward and outward movement across said working faces, means for rotating said tool, and means for moving said cutter in timed relation to the rotation of said tool so that a machining of the trailing face of one tooth occurs during the inward movement of said cutter and a machining of the leading face of an adjacent tooth occurs during the outward movement of said cutter.

9. A device for machining a plurality of adjacently disposed slots in the working faces of the teeth of a gear-like cutting tool, of selected form, which comprises, in combination, a cutter having a plurality of spaced slotting lands, means for supporting said cutter for rectilinear movement inwardly and outwardly across said tooth faces, means for rotating said tool, and means for moving said cutter in timed relation to said tool rotation so that slots are cut in the trailing face of one tool tooth during the inward movement of said cutter and slots are cut in the leading face of an adjacent tooth during the outward movement of said cutter.

10. The method of machining a selected tooth form on a toothed circular element which includes the steps of rotating said circular element, positioning a cutter for movement in a rectilinear path in the plane of a tooth face of said element, advancing said cutter in said rectilinear path at such a rate relative to the rate of rotation of said element as to machine said selected form on said tooth face, and retarding said cutter advance as a tooth root of said element is approached, thereby to bring said cutter out of cutting relation to said element.

11. The method of machining a selected tooth form on a toothed circular element which includes the steps of rotating said circular element, positioning a cutter for movement in a rectilinear path in the plane of a tooth face of said element, advancing said cutter in said rectilinear path at such a rate relative to the rate of rotation of said element as to machine said selected form on said tooth face, and increasing the rate of rotation of said element relative to the rate of advance of said cutter as said cutter approaches a tooth root of said element to thereby cause said cutter to move out of machining relation to said element.

12. In combination, a gear-like tool having teeth thereon the working faces whereof are to have narrow spaced slots machined therein, a cutter having a slotted cutting edge, means for supporting said cutter and tool relative to each other to have the cutting edge disposed at the addendum of a tooth inwardly of the flank face thereof, and means for relatively moving the tool and cutter so as to advance the cutter radially of the tool and cause it to form slots in the flank of said one tooth extending from the addendum toward the dedendum portion thereof, said moving means being constructed and arranged to cause the cutter to form progressively shallower slots and ultimately move out of cutting relation to said flank when said cutter is adjacent said dedendum portion.

13. In combination, a gear-like tool having teeth thereon the working faces whereof are to have narrow spaced slots machined therein, a cutter having a slotted cutting edge, means for supporting said cutter and tool relative to each other to have the cutting edge disposed at the addendum of a tooth inwardly of the flank face thereof, and means for advancing the tool and cutter relatively toward each other so as to cause the cutter to substantially follow the form of the flank face and machine slots therein from the addendum toward the dedendum portion of the tooth, said moving means being constructed and arranged to cause the cutting edge of the cutter to cut progressively shallower slots and ultimately move out of contact with the flank of the tooth of the tool when said cutter is adjacent the dedendum portion thereof.

JOSEPH C. DRADER.